United States Patent
Herman et al.

(10) Patent No.: US 10,927,590 B2
(45) Date of Patent: Feb. 23, 2021

(54) ENHANCED SERVICE

(71) Applicant: Ford Global Technologies, LLC, Dearborn, MI (US)

(72) Inventors: David A. Herman, Southfield, MI (US); Howard Paul Tsvi Linden, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 780 days.

(21) Appl. No.: 15/092,687

(22) Filed: Apr. 7, 2016

(65) Prior Publication Data

US 2017/0292313 A1    Oct. 12, 2017

(51) Int. Cl.
| | |
|---|---|
| *E05F 15/73* | (2015.01) |
| *H04W 4/80* | (2018.01) |
| *G06Q 50/30* | (2012.01) |
| *G08G 1/00* | (2006.01) |
| *H04L 29/08* | (2006.01) |
| *G06Q 30/02* | (2012.01) |
| *G07F 17/00* | (2006.01) |
| *E05F 15/40* | (2015.01) |

(Continued)

(52) U.S. Cl.
CPC ............ *E05F 15/73* (2015.01); *G06Q 50/30* (2013.01); *G08G 1/202* (2013.01); *H04L 67/12* (2013.01); *H04W 4/80* (2018.02); *E05Y 2201/412* (2013.01); *E05Y 2400/30* (2013.01); *E05Y 2400/44* (2013.01); *E05Y 2900/531* (2013.01); *E05Y 2900/548* (2013.01)

(58) Field of Classification Search
CPC .......... E05F 15/73; H04W 4/80; G06Q 50/30; H04L 67/12; G08G 1/202; E05Y 2201/412; E05Y 2900/548; E05Y 2400/44; E05Y 2900/531; E05Y 2400/30
USPC ............................................. 705/13
See application file for complete search history.

(56) References Cited

U.S. PATENT DOCUMENTS

| 3,344,554 A | 10/1967 | Misaka et al. | |
|---|---|---|---|
| 4,458,446 A * | 7/1984 | Mochida ............... | B60K 28/00 49/28 |

(Continued)

FOREIGN PATENT DOCUMENTS

| EP | 3007123 A1 | 4/2016 |
|---|---|---|
| JP | 2005336934 A | 12/2005 |

(Continued)

OTHER PUBLICATIONS

Bimmerforums.com, "Seat belt stuck in passenger door, Door won't open" https://www.bimmerforums.com/forum/showthread.php?159446-Seat-belt-stuck-in-passenger-door-Door-won-t-open! (Year: 2003).*

(Continued)

*Primary Examiner* — George Chen
*Assistant Examiner* — Dione N. Simpson
(74) *Attorney, Agent, or Firm* — Frank A. MacKenzie; Bejin Bieneman PLC

(57) ABSTRACT

A computing device determines that one or more users have departed a vehicle. The computing device determines whether a vehicle door is ajar. A power door subsystem is actuated to close the vehicle door when the vehicle door is ajar and the vehicle has no users. A fare is determined when the vehicle door is in a latched position. A message is sent to the at least one of the one or more users indicating the fare.

20 Claims, 2 Drawing Sheets

(51) Int. Cl.
*G07B 13/04* (2006.01)
*G07B 15/00* (2011.01)

(56) References Cited

U.S. PATENT DOCUMENTS

| | | | |
|---|---|---|---|
| 5,069,000 A | 12/1991 | Zuckerman | |
| 5,239,779 A * | 8/1993 | DeLand | B60J 5/06 |
| | | | 49/360 |
| 5,477,206 A | 12/1995 | Rodriguez, Sr. | |
| 5,780,937 A | 7/1998 | Kong | |
| 8,209,093 B2 | 6/2012 | Hill | |
| 9,168,894 B2 | 10/2015 | Ovenshire et al. | |
| 9,552,564 B1 * | 1/2017 | Martenis | G07C 5/008 |
| 2003/0158644 A1 * | 8/2003 | Basson | G08B 13/19647 |
| | | | 701/49 |
| 2004/0090083 A1 | 5/2004 | Greuel et al. | |
| 2007/0018790 A1 | 1/2007 | LaFrance | |
| 2007/0216517 A1 | 9/2007 | Kurpinski et al. | |
| 2007/0266635 A1 | 11/2007 | Sugiura et al. | |
| 2008/0054652 A1 * | 3/2008 | Cummins | E05B 77/06 |
| | | | 292/336.3 |
| 2008/0195428 A1 * | 8/2008 | O'Sullivan | G06Q 50/30 |
| | | | 705/6 |
| 2009/0051192 A1 | 2/2009 | Ewing et al. | |
| 2009/0249699 A1 | 10/2009 | Yulkowski | |
| 2010/0153279 A1 * | 6/2010 | Zahn | G06Q 10/08355 |
| | | | 705/80 |
| 2012/0310515 A1 | 12/2012 | Kirshon et al. | |
| 2013/0099940 A1 | 4/2013 | Protopapas | |
| 2013/0135088 A1 | 5/2013 | Simha | |
| 2013/0231824 A1 | 9/2013 | Wilson et al. | |
| 2014/0175808 A1 * | 6/2014 | Faust | E05C 3/12 |
| | | | 292/95 |
| 2014/0278607 A1 | 9/2014 | Johnson et al. | |
| 2015/0061856 A1 | 3/2015 | Raman et al. | |
| 2015/0116085 A1 | 4/2015 | Juzswik | |
| 2015/0226146 A1 | 8/2015 | Elwart et al. | |
| 2015/0283886 A1 * | 10/2015 | Nania | E05F 15/73 |
| | | | 296/146.4 |
| 2015/0310510 A1 | 10/2015 | Kelly et al. | |
| 2015/0338849 A1 | 11/2015 | Nemec et al. | |
| 2015/0339928 A1 | 11/2015 | Ramanujam | |
| 2016/0117867 A1 * | 4/2016 | Yuan | G07B 15/00 |
| | | | 705/13 |
| 2016/0201361 A1 * | 7/2016 | Hanaki | E05B 77/04 |
| | | | 292/200 |

FOREIGN PATENT DOCUMENTS

| | | |
|---|---|---|
| JP | 2006159939 A | 6/2006 |
| KR | 20120051134 A * | 5/2012 |
| WO | 2014194819 A1 | 12/2014 |

OTHER PUBLICATIONS

"Google vs. Uber and the race to self-driving taxis"; Hawkins, Andrew; Dec. 16, 2015 (Year: 2015).*
UK Search Report dated Sep. 8, 2017.

* cited by examiner

ENHANCED SERVICE

BACKGROUND

An autonomous vehicle may be operated without a human operator as a service vehicle, sometimes revered to as a livery vehicle, that transports users without a human operator (e.g., driver) in exchange for a fare. However, operating a service without a human operator can present problems. For example, if a door of an autonomous service remains ajar after one or more users leave the service vehicle, the service vehicle may not determine that a ride is complete.

DETAILED DESCRIPTION

Autonomous vehicles-for-hire may include a power door subsystem to close one or more ajar vehicle doors and complete a user's ride. The power door subsystem closes the ajar vehicle doors, allowing the service vehicle to complete the ride and collect a fare. The service vehicle may include a computing device to actuate the power door subsystem to close the ajar doors and to determine the fare upon closing the ajar doors. The computing device may continue accruing the fare when the doors are ajar and send a message to a user indicating that the doors are ajar and/or that the fare is continuing to accrue. The computing device may also accrue the fare when objects are left in and/or on the service vehicle and/or when at least one of the occupants remains in and/or near the service vehicle. Once the service vehicle is empty of users and objects, the computing device determines that a ride is ended, determines the fare, and sends a message stating the fare to a user. Further, the computer can receive a request for a new ride.

Figure 1:
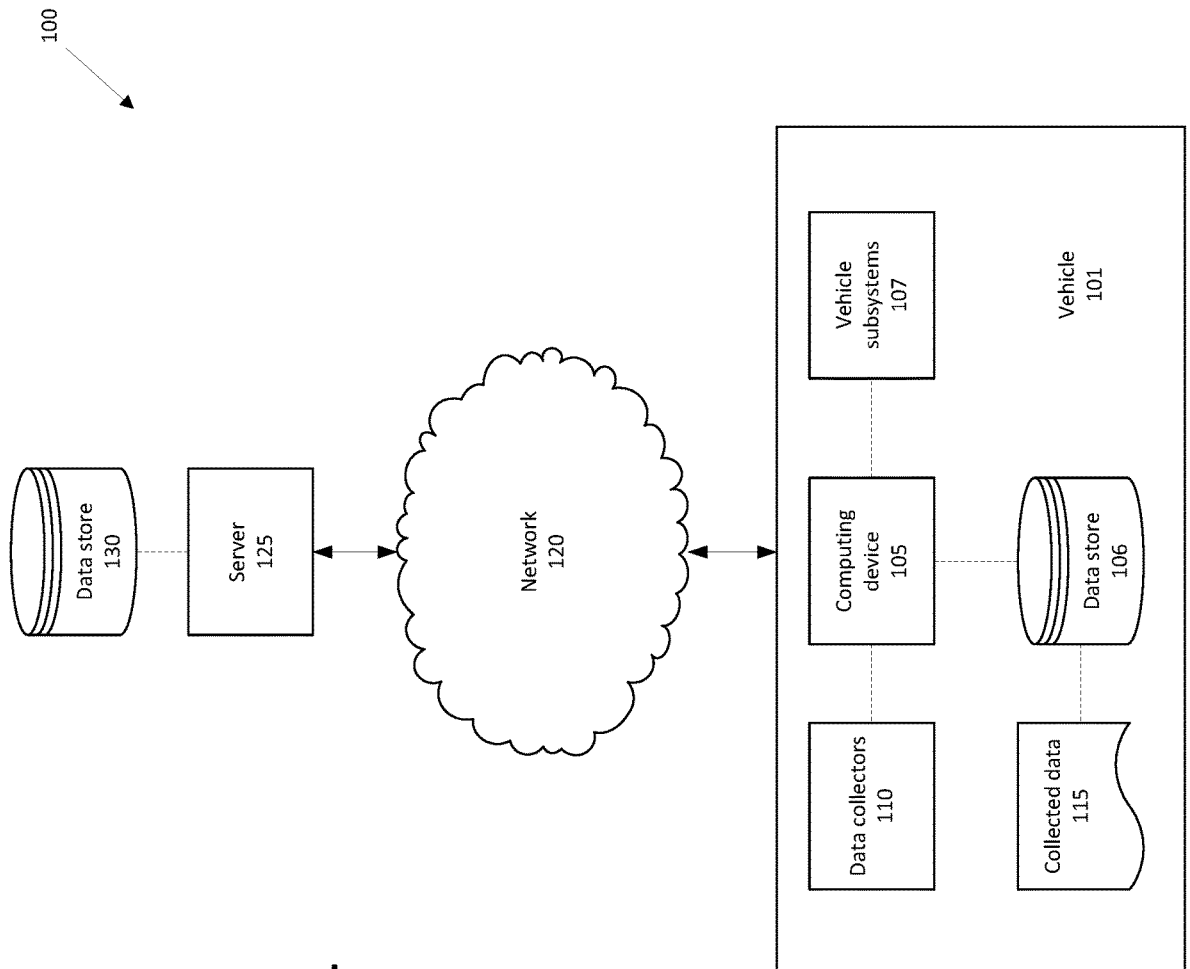
FIG. 1 is a block diagram of an example system for monitoring and responding to a power door subsystem.

FIG. 1 illustrates a system 100 for actuating a power door subsystem and completing a ride in a vehicle 101. A computing device 105 in the vehicle 101 is programmed to receive collected data 115 from one or more data collectors 110, e.g., vehicle 101 sensors, concerning various values related to the vehicle 101.

The computing device 105 is generally programmed for communications on a controller area network (CAN) bus or the like. The computing device 105 may also have a connection to an onboard diagnostics connector (OBD-II). Via the CAN bus, OBD-II, and/or other wired or wireless mechanisms, the computing device 105 may transmit messages to various devices in a vehicle and/or receive messages from the various devices, e.g., controllers, actuators, sensors, etc., including data collectors 110. Alternatively or additionally, in cases where the computing device 105 actually comprises multiple devices, the CAN bus or the like may be used for communications between devices represented as the computing device 105 in this disclosure. In addition, the computing device 105 may be programmed for communicating with the network 120, which, as described below, may include various wired and/or wireless networking technologies, e.g., cellular, Bluetooth, wired and/or wireless packet networks, etc.

The data store 106 may be of any known type, e.g., hard disk drives, solid-state drives, servers, or any volatile or non-volatile media. The data store 106 may store the collected data 115 sent from the data collectors 110.

The vehicle 101 may include a plurality of subsystems 107. The subsystems 107 control vehicle 101 components, e.g., throttle or other propulsion, braking, steering, a vehicle seat, mirror, etc. The subsystems 107 include, e.g., a propulsion subsystem (e.g., an internal combustion engine, an electric motor, etc.), a steering subsystem, a power door subsystem, etc. The computing device 105 may actuate the subsystems 107 to control the vehicle 101 components, e.g., close a vehicle 101 door.

The computing device 105 is typically programmed to operate the vehicle subsystems 107 with limited or no input from a human operator, i.e., the computing device 105 may operate the vehicle subsystems 107. In general, programming of the computer 105 to control various vehicle 101 components as referenced above is known. Such programming as is presently known, and including possible future developments thereto, may be referred to as a "virtual operator," and may be stored in the data store 106 and/or the server 125.

One of the subsystems 107 may be a power door subsystem 107. The power door subsystem 107 closes a vehicle 101 door, e.g., a passenger door, a trunk lid, etc., without input from a vehicle 101 occupant. The power door subsystem 107 may include, e.g., an actuator to pull the vehicle 101 door to a latched position and to secure the vehicle 101 door with a latch attached to a vehicle 101 body. The latched position is defined as a position of the door when the latch secures the door, and an unlatched position is a position of the door when the latch does not secure the door. The power door subsystem 107 may thus close a vehicle 101 door that is ajar, i.e., not in the latched position. The virtual operator may be programmed to actuate a propulsion subsystem 107 only when the vehicle 101 door is in the latched position, and the power door subsystem 107 may be actuated to move the vehicle 101 doors to the latched position.

An example power door subsystem 107 may include an actuator that actuates a motor. The motor drives an arm connected to the door and to a vehicle 101 body, the arm moving the door toward the vehicle 101 body to engage the latch, thereby placing the door in the latched position. The motor drives the arm to move the door away from the vehicle 101 body once the latch is disengaged from the door, moving the door from the latched position to allow users into the vehicle 101. The power door subsystem 107 may include data collectors 110, e.g., Hall effect sensors, arranged to detect at least one magnet in at least one of a pawl in the door and a striker in the vehicle 101 body. The power door subsystem 107 defines the latched position as when the pawl in the door engages the striker, securing the vehicle 101 door. When the data collectors 110 detect that the door is in the latched position, the data collectors 110 send data 115 indicating that the door is in the latched position to the computing device 105. The computing device 105 is programmed to actuate the vehicle subsystems 107 based at least in part on whether the door is in the latched position or in the unlatched position. For example, the computing device 107 may be programmed to actuate the propulsion subsystem 107 only when the door is in the latched position. The power door subsystem 107 may include a primary latch and a secondary latch. In this example, the latched position is defined here when both the primary latch and the secondary latch engage the vehicle 101 body, and the unlatched position (i.e., the door is ajar) is defined when at least one of the primary latch and the secondary latch are disengaged.

Data collectors 110 may include a variety of devices. For example, various controllers in a vehicle may operate as data collectors 110 to provide data 115 via the CAN bus, e.g., data 115 relating to vehicle speed, acceleration, subsystem and/or component functionality, etc. Further, other data collectors 110 could include RADAR, LIDAR, cameras, motion detectors, weight sensors, etc., i.e., data collectors 110 to provide data 115 for evaluating whether a user and/or an object is present in and/or on the vehicle 101.

Collected data 115 may include a variety of data collected in a vehicle 101. Examples of collected data 115 are provided above, and moreover, data 115 are generally collected using one or more data collectors 110, and may additionally include data calculated therefrom in the computing device 105, and/or at the server 125. In general, collected data 115 may include any data that may be gathered by the data collectors 110 and/or computed from such data. For example, as is known, the computing device 105 may collect data 115 from one or more sensor data collectors 110 indicating whether a vehicle 101 door is ajar, on an obstacle blocking the vehicle 101 door from closing, etc.

The system 100 may further include a network 120 connected to a server 125 and a data store 130. The computer 105 may further be programmed to communicate with one or more remote sites such as the server 125, via a network 120, such remote site possibly including a data store 130. The network 120 represents one or more mechanisms by which a vehicle computer 105 may communicate with a remote server 125. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be programmed to determine an appropriate action for one or more vehicles 101, and to provide direction to the computing device 105 to proceed accordingly. The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115. The server 125 may store a profile that includes data 115, as described above, including financial information of a user, e.g., credit card information.

The vehicle 101 may be a service vehicle. As used herein, a "service vehicle" is a vehicle 101 that transports at least one user to a destination, exchange for compensation, i.e., a fare. An example service vehicle may be a vehicle 101 programmed with a virtual operator to transport one or more users to a destination and to determine and collect the fare, i.e., an autonomous service vehicle.

The service vehicle may undertake a "ride," which is defined herein as a user event that includes transporting one or more users to a destination determined by the user(s), typically in exchange for compensation, i.e., a fare. The ride begins upon receipt in a computing device 105 of a user request for transportation by the service vehicle, and ends when the user leaves the service vehicle and the service vehicle determines the fare. For example, when a user requests a service vehicle, a vehicle 101 accepts the request and the ride begins. The vehicle 101 transports the user to a destination determined by the user. When the user leaves the vehicle 101 and the vehicle 101 is ready to accept another request and move, e.g., execute vehicle operations to travel along a route, to the next ride, the vehicle 101 ends the current ride and determines the fare to charge the user for the ride. The vehicle 101 can then receive a request for a second ride from a second user, determine a location of the second user, and actuate a propulsion subsystem 107 to move the vehicle 101 to the location of the second user.

Used herein, the term "fare" refers to a price of the ride. The fare may include, e.g., a predetermined base charge, a price charged per unit of distance traveled (e.g., per mile traveled), i.e., a distance charge, and a price charged per unit of time elapsed (e.g., per minute elapsed), a time charge. An example fare may include a $0.50 base charge, a distance charge of $0.30 per mile traveled from receiving the user to reaching the destination, and a time charge of $0.30 per minute elapsed from the service vehicle receiving the user until reaching the destination and the preparing for the next ride. Thus, actions that prevent the vehicle 101 from ending the current ride and preparing for the next ride allow the computing device 105 to continue to accrue the fare until the vehicle 101 is ready for the next ride. For example, if one of the users leaves a vehicle 101 door open, the vehicle 101 may be unable to accept a new ride and the computing device 105 may continue to accrue the fare until the vehicle 101 door is moved to the latched position by, e.g., a power door subsystem 107, one of the users, etc.

Another example action that can prevent the vehicle 101 from ending the current ride and moving to the next ride is an obstacle preventing the power door subsystem 107 from closing the vehicle 101 door. An "obstacle" as described herein is an object that would contact the vehicle 101 door as the power door subsystem 107 closes the door and prevent the vehicle 101 door from reaching the latched position. If the power door subsystem 107 attempts to close the vehicle 101 door while an obstacle blocks the path of the door, the door will contact the obstacle, possibly damaging the door and/or the obstacle, and remain ajar. Examples of obstacles may include, e.g., a suitcase, a seat belt extended into the path of the closing door, a jacket hanging off of a vehicle 101 seat in the path of the door, etc. If an obstacle prevents the power door subsystem 107 from moving the door to the latched position, the computing device 105 may continue accruing the fare (i.e., the time charge) until the obstacle is removed and door is moved to the latched position, e.g., by the power door subsystem 107. An example process 200 below describes completion of the ride and determining the fare.

The computing device 105 may be programmed to send a message to at least one of the users. As used herein, a "message" is a communication over, e.g., the network 120 from the computing device 105 to one of the users. The message may be, e.g., a text message, an email, a message in a smartphone application, etc. The message may include information about the ride, e.g., the estimated time to the destination, the total fare, the continuing accrual of the fare while an object remains in the vehicle 101, etc.

Figure 2:
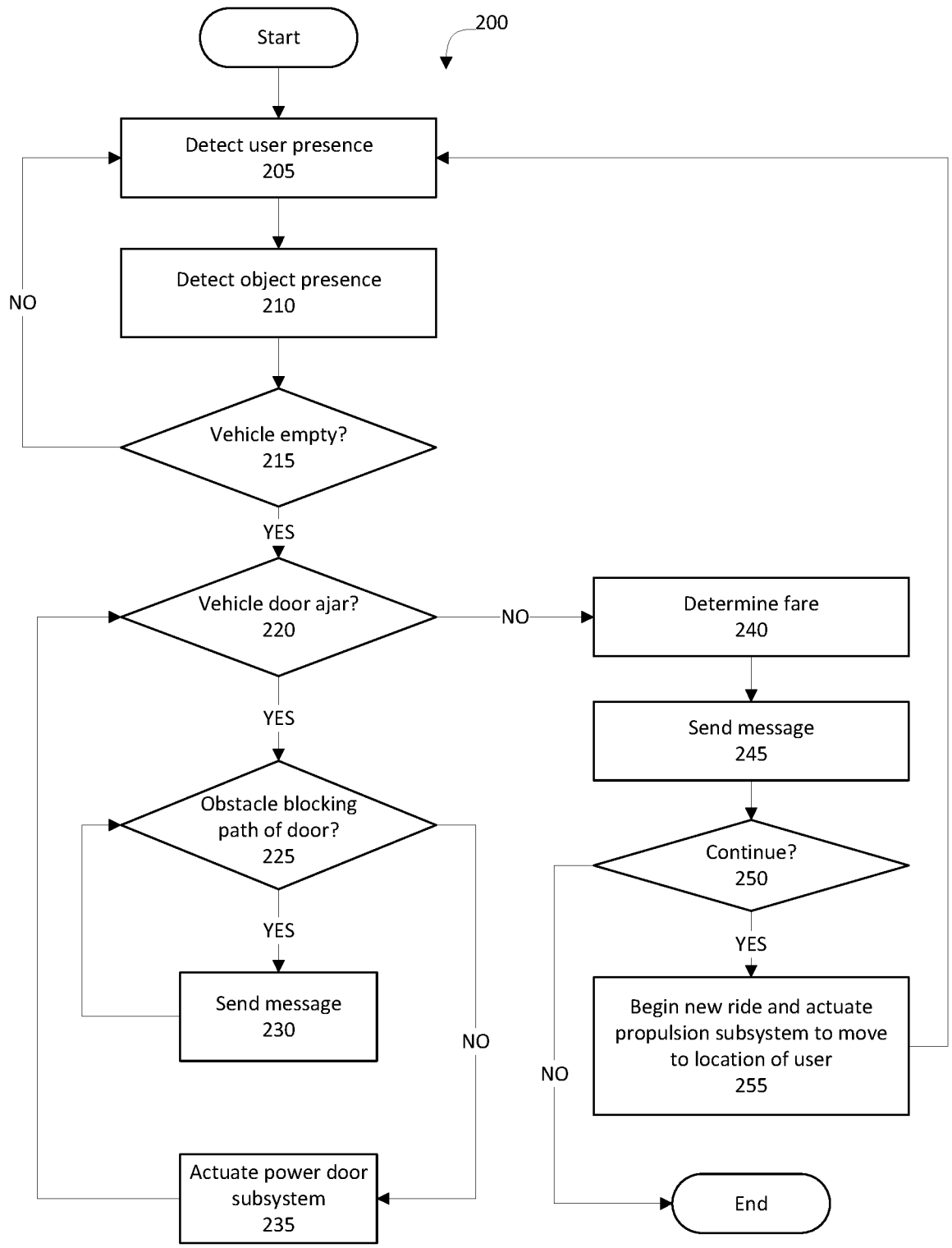
FIG. 2 illustrates an example process for monitoring and responding to, including actuating, the power door subsystem.

FIG. 2 illustrates an example process 200 for actuating the power door subsystem 107, determining a fare for a ride, and moving the vehicle 101 to a new ride. The process 200 begins in a block 205, in which the computing device 105 determines whether one or more users are present in the vehicle 101. The computing device 105 may collect data 115 from the data collectors, e.g., LIDAR, cameras, seat weight sensors, etc., to determine whether one or more users are present in the vehicle 101. In addition, the computing device 105 may collect data 115 from data collectors 110 to determine whether one or more users are within a predetermined distance, e.g., 5 meters, of the vehicle 101. If one or more users are in or near the vehicle 101, the one or more users may not have reached a desired destination and may want to continue the ride. The computing device 105 may continue accruing the fare as long as at least one user remains in the vehicle 101.

Next, in a block 210, the computing device 105 detects objects in and/or on the vehicle 101. A user may leave objects, e.g., a purse, a cell phone, a wallet, a coffee cup, etc., in an interior of the vehicle 101, e.g., in the passenger compartment. In addition, a user may leave one or more objects on an exterior of the vehicle 101, e.g., on a roof, on a hood, etc. A user may return to the vehicle 101 upon realizing that an object has been left in the vehicle 101. Therefore, the computing device 105 may be programmed to wait until one or more users return to the vehicle 101 before determining the fare for a ride. The computing device 105 may use data 115 collected from data collectors 110, e.g., cameras, seat weight sensors, etc., to determine whether one or more objects remain in and/or on the vehicle 101 after the users have left the vehicle 101. For example, the seat weight sensors may detect a weight on one of the vehicle 101 seats that is less than a human body weight, as is known, and may determine that the weight is from an object on one of the vehicle 101 seats. One of the cameras may then capture an image of the object and determine that the object is, e.g., a purse. The computing device 105 may send a notification to at least one of the users indicating that the object is in or on the vehicle 101, that at least one of the users should return to the vehicle 101 to retrieve the object, and that the fare will continue accruing until the object is removed. The message may include, e.g., the captured image of the object. The computing device 105 may continue accruing the fare as long as at least one object remains in the vehicle 101.

Next, in a block 215, the computing device 105 determines whether the vehicle 101 is empty of users, i.e., is unoccupied. That is, the computing device 105 determines whether the one or more users have left the vehicle 101 and taken the one or more objects from the vehicle 101. If the vehicle 101 is not empty, i.e., one or more users are in or near the vehicle 101 and/or one or more objects remain in the vehicle 101, the process 200 returns to the block 205 to collect more data 115 about users and objects in the vehicle 101. Otherwise, the process 200 continues in a block 220.

In the block 220, the computing device 105 determines whether a vehicle 101 door is ajar, i.e., not in the latched position. The computing device 105 may be programmed not to actuate the propulsion subsystem 107 while one of the vehicle 101 doors is ajar, which may prevent the vehicle 101 from accepting a new ride. The vehicle 101 doors may include, e.g., one of the passenger doors, a vehicle 101 hood, a vehicle 101 trunk lid, etc. As described above, the virtual operator may be programmed to actuate the propulsion subsystem only when the vehicle 101 doors are in the latched position, so an ajar door would prevent the virtual operator from actuating the propulsion subsystem 107 and moving the vehicle 101 to the one or more users of the new ride. Thus, the computing device 105 may be programmed to continue accruing the fare when at least one of the vehicle 101 doors is ajar. If one of the doors is ajar, the process 200 continues in a block 225. Otherwise, the process 200 continues in a block 240.

In the block 225, the computing device 105 detects whether an obstacle prevents the power door subsystem 107 from closing the ajar door. The computing device 105 may collect data 115 from data collectors 110, e.g., cameras, motion detectors, etc., about obstacles that may prevent the power door subsystem 107 from closing the door. As described above, the obstacle prevents the power door subsystem 107 from closing the door. If the computing device 105 detects an obstacle preventing the power door subsystem 107 from closing the ajar door, the process 200 continues in a block 230. Otherwise, the process 200 continues in a block 235.

In the block 230, the computing device 105 sends a message to one of the users indicating that there is an obstacle that must be removed to close the ajar door. The message may include, e.g., an image of the obstacle, and a notice that the fare is still accruing and will continue to accrue until the obstacle is removed and the door is in the latched position. The process 200 then returns to the block 225 to determine whether any obstacles remain.

In the block 235, the computing device 105 actuates the power door subsystem 107 to close the ajar door. The power door subsystem 107, as described above, moves a vehicle 101 door to the latched position when no obstacle blocks the path of the closing door. The process 200 then returns to the block 220 to determine if any doors remain ajar.

In the block 240, the computing device 105 completes the current ride and determines the fare. The computing device 105 stops accruing the fare and determines the value of the fare charged to one of the users. The fare may be determined by, e.g., adding the base charge, the distance charge, and the time charge, including any additional accrued time charge resulting from an object in the vehicle 101 and/or an obstacle blocking the vehicle 101 door, as described above.

Next, in a block 245, the computing device 105 sends a message to one of the users with the fare. The message may include the value of the total fare and, e.g., a confirmation that the fare was charged to a credit card of the user. As described above, the message may be, e.g., a text message, an email, a message in a smartphone application, etc.

Next, in a block 250, the computing device 105 determines whether to continue the process 200. For example, the computing device 105 may receive a request for another ride and may continue the process 200 for a new ride. In another example, the computing device 105 may determine not to continue the process 200 and may execute instructions to navigate the vehicle 101 to a safe stopping area, e.g., a parking lot, and shut down the vehicle 101. If the computing device 105 decides to continue, the process 200 continues in a block 255. Otherwise, the process 200 ends.

In the block 255, the computing device 105 receives a request for a new ride, i.e., a second ride, from at least one new user and begins accruing a new fare, i.e., a second fare, for the new ride. The computing device 105 determines the location of at least one of the users that requested the new ride, determines a route to move the vehicle 101 from the current location of the vehicle 101 to the location of at least one of the users, and actuates the propulsion, braking, and steering subsystems 107 to move the vehicle 101 to the location of at least one of the users that requested the new ride. The process 200 then returns to the block 205 to determine when the ride ends and to determine the fare for the new ride.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices 105 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 200, one or more of the steps could be omitted, or the steps could be executed in a different order than shown in FIG. 2. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer in a vehicle including a processor and a memory, the memory storing instructions executable by the computer to:
   determine that one or more users have departed the vehicle;
   determine whether a vehicle door is ajar;
   when the vehicle door is ajar and the vehicle is unoccupied, actuate a power door subsystem to: (1) close the vehicle door and (2) to engage a pawl of the vehicle door to a striker of a vehicle body;
   determine a fare including a distance charge and a time charge, the time charge based on a time starting at an initiation of a ride and accruing until the pawl of the vehicle door engages the striker of the vehicle body; and
   send a message to the at least one of the one or more users indicating the fare.

2. The system of claim 1, wherein the instructions further include instructions to identify at least one object in an interior of the vehicle and to take an action based on identifying the object is in the interior of the vehicle.

3. The system of claim 2, wherein the action includes providing an instruction to continue accruing the time charge after the pawl of the vehicle door engages the striker of the vehicle body until the object is removed from the vehicle.

4. The system of claim 1, wherein the instructions further include instructions to identify at least one object on an exterior of the vehicle and to take an action based on identifying that the object is on the exterior of the vehicle.

5. The system of claim 1, wherein the instructions further include instructions to send a message to at least one of the one or more the users indicating that the vehicle door is ajar when an obstacle prevents the power door subsystem from closing the vehicle door.

6. The system of claim 5, wherein the instructions further include instructions to continue accruing the fare until the obstacle is removed from preventing the closing of the vehicle door.

7. The system of claim 1, wherein the instructions further include instructions to complete a ride associated with the fare, receive a request from a user for a second ride, initiate a second fare, and to actuate a vehicle subsystem to move the vehicle to a location of the user.

8. The system of claim 1, wherein the instructions further include instructions to continue to accrue the time charge when at least one of the one or more the users is within a predetermined distance from the vehicle.

9. The system of claim 1, wherein the instructions further include instructions to determine whether a vehicle trunk is ajar and to actuate the power door subsystem to close the vehicle trunk before determining the fare.

10. The system of claim 1, wherein the time charge is based on a time starting at an initiation of the ride and accruing until both a primary latch and a secondary latch are in respective latched positions.

11. A method, comprising:
   determining that one or more users have departed a vehicle;
   determining whether a vehicle door is ajar;
   when the vehicle door is ajar and the vehicle is unoccupied, actuating a power door subsystem to: (1) close the vehicle door and (2) to engage a pawl of the vehicle door to a striker of a vehicle body;

determining a fare including a distance charge and a time charge, the time charge based on a time starting at an initiation of a ride and accruing until a pawl of the vehicle door engages a striker of a vehicle body; and sending a message to the at least one of the one or more users indicating the fare.

12. The method of claim 11, further comprising identifying at least one object in an interior of the vehicle and taking an action based on identifying the object is in the interior of the vehicle.

13. The method of claim 12, wherein the action includes continuing accruing the time charge after the pawl of the vehicle door engages the striker of the vehicle body until the object is removed from the vehicle.

14. The method of claim 11, further comprising identifying at least one object on an exterior of the vehicle and taking an action based on identifying that the object is on the exterior of the vehicle.

15. The method of claim 11, further comprising sending a message to at least one of the one or more the users indicating that the vehicle door is ajar when an obstacle prevents the power door subsystem from closing the vehicle door.

16. The method of claim 15, further comprising continuing accruing the fare until the obstacle is removed from preventing the closing of the vehicle door.

17. The method of claim 11, further comprising completing a ride associated with the fare, receiving a request from a user for a second ride, initiating a second fare, and actuating a vehicle subsystem to move the vehicle to a location of the user.

18. The method of claim 11, further comprising continuing to accrue the time charge when at least one of the one or more users is within a predetermined distance from the vehicle.

19. The method of claim 11, further comprising determining whether a vehicle trunk is ajar and to actuating the power door subsystem to close the vehicle trunk before determining the fare.

20. The method of claim 11, wherein the time charge is based on a time starting at an initiation of the ride and accruing until both a primary latch and a secondary latch are in respective latched positions.

* * * * *